Figure 1:
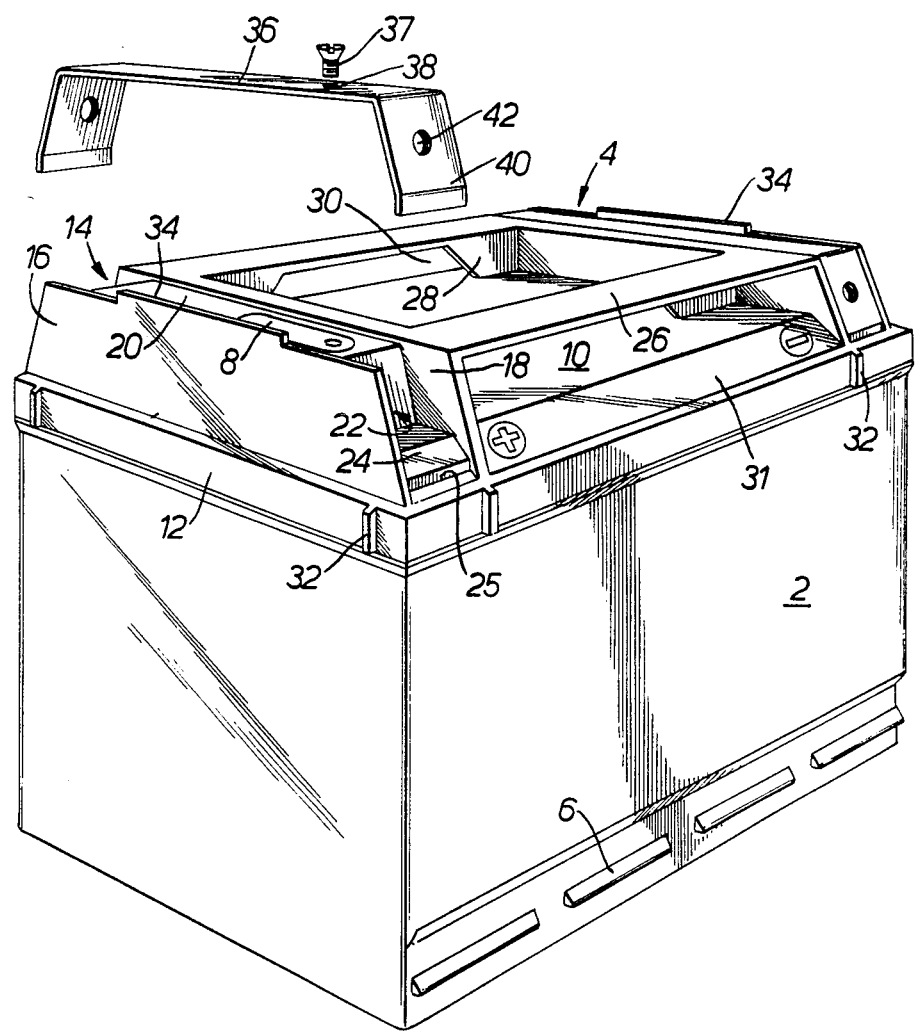

United States Patent [19]

Humphreys et al.

[11] Patent Number: 4,562,128
[45] Date of Patent: Dec. 31, 1985

[54] ELECTRIC STORAGE BATTERIES

[75] Inventors: John K. Humphreys, Whitefield; Joseph Valentine, Bolton, both of England

[73] Assignee: Chloride Group Public Limited Company, London, England

[21] Appl. No.: 667,821

[22] Filed: Nov. 2, 1984

[30] Foreign Application Priority Data

Nov. 4, 1983 [GB] United Kingdom ................. 8329565

[51] Int. Cl.⁴ ......................... H01M 2/02; H01M 2/30
[52] U.S. Cl. ..................................... 429/178; 429/148; 429/175; 429/179; 429/187
[58] Field of Search ............... 429/187, 148, 178, 179, 429/120, 71

[56] References Cited

U.S. PATENT DOCUMENTS

| 3,745,048 | 7/1973 | Dinkler et al. | 429/120 |
| 3,871,924 | 3/1975 | DeMattie et al. | 429/178 |
| 4,424,264 | 1/1984 | McGuire et al. | 429/179 |
| 4,444,853 | 4/1984 | Halsall et al. | 429/178 |

FOREIGN PATENT DOCUMENTS 2087133  5/1982  United Kingdom ............... 429/178

Primary Examiner—Donald L. Walton
Attorney, Agent, or Firm—Finnegan, Henderson, Farabow, Garrett & Dunner

[57] ABSTRACT

An electric storage battery includes a rectangular container sealed by a lid. The lid affords spaced upstanding formations extending adjacent respective opposed side edges of lid and support means comprising spaced handle webs extending between the upstanding formation. The handle webs afford a flat upper surface which is vertically spaced from the remainder of the lid and adapted to support a further such battery. The outer edges of the handle webs are spaced inwardly from the two opposed side surfaces of the container when viewed in plan.

15 Claims, 4 Drawing Figures

ELECTRIC STORAGE BATTERIES

The present invention relates to electric storage batteries, e.g. of lead acid type, and is particularly concerned with so called standby batteries. Standby batteries are that type of battery which are used in conjunction with electric power consuming installations whose continuous operation is essential and are connected to supply the installations with electric power if the mains power supply should fail thereby ensuring continued operation of the installations until the mains power is restored.

Standby batteries are therefore in general not required to produce electric power very frequently but when they do they may produce a considerable current for a considerable period of time and therefore tend to heat up. In connection with larger installations, such as telephone exchanges, it is common to provide a large number of standby batteries in a stack electrically connected in series and/or parallel. It will be appreciated that the problem of the generation of heat and more particularly of the dissipation of this heat is exacerbated when a number of batteries are arranged in a stack since it is difficult for cooling air to circulate around the batteries. It will be appreciated also that, quite apart from the fact that many batteries are not readily stackable, it can be problematic electrically to connect a large number of batteries together in a stack since the terminals of a battery tend to be obscured or rendered relatively inaccessible by an adjacent battery and this may render it necessary to space the batteries apart and to connect them by a number of relatively lengthy trailing connectors which increases the overall resistance of the batteries.

Accordingly, it is an object of the present invention to provide an electric storage battery which may be readily stacked on one or more similar batteries and which is so constructed that, even when it forms part of a stack of a large number of such batteries, air can readily circulate around it to keep it cool but which nevertheless is so constructed that a relatively dense and homogeneous stack of such batteries may be formed.

According to the present invention an electric storage battery includes a substantially rectangular section container sealed by a lid, the lid affording two spaced upstanding formations extending adjacent respective opposed side edges of the lid and support means extending between the two upstanding formations, the support means affording a substantially flat upper surface which is vertically spaced from the remainder of the lid and adapted to support a further such battery, the outer edges of the support means being spaced inwardly from the two opposed side surfaces of the container when viewed in plan. Preferably the support means constitutes a handle means by which the battery may be lifted. Thus the battery in accordance with the present invention has a handle by which the battery can be readily lifted and added to a stack of batteries and which affords a flat support surface permitting it to support a further such battery in the stack. By virtue of the fact that the support surface of the handle means is spaced from the remainder of the lid there will automatically be a gap between vertically adjacent batteries in a stack through which air may flow and the disposition of the outer edges of the handle means inwards from the opposed side surfaces of the container when viewed in plan automatically results in there being what may be thought of as an air inlet aperture through which cooling air may flow into the space between vertically adjacent batteries in a stack.

The handle means may comprise two spaced elongate handle webs which not only facilitates the handling of the battery by the handle means but also results in an economy of material and may provide an additional air flow path in a stack of such batteries through which cooling air may flow. The inner edge of each handle web is preferably connected to the remainder of the lid by a respective vertical reinforcing web, each reinforcing web having an aperture to permit the circulation of air.

In the preferred construction the lid affords a substantially flat surface extending between the upstanding formations and spaced below the upper surface of the support means and the surface of the lid is preferably inclined downwardly and outwardly along the two opposed side edges which extend perpendicular to those edges adjacent which the upstanding formations are situated. The provision of such inclined surfaces will somewhat increase the size of the space through which inflowing cooling air may flow and additionally acts as a "lead in" for such cooling air. The two ends of the upstanding formations are preferably inclined downwardly and outwardly at an acute angle to the horizontal and this will additionally ensure the presence of a gap for cooling air between adjacent batteries in the same layer of a stack of such batteries.

It is preferred that on each side surface of the battery, e.g. of the lid, there are two or more spacing projections which extend beyond the associated side surface of the container when viewed in plan since this will ensure that adjacent batteries in the same layer of a stack of batteries cannot be placed so close together that cooling air cannot flow between them.

The upper surface of the upstanding formations is preferably substantially coplanar with that of the handle means and will thus provide an additional support and stabilising surface for a battery stacked on top of it. Each upstanding formation may include a projection which extends above the support surface of the handle means and is adapted to be received in a recess formed in, or located behind a ledge formed on, the base of a further such battery supported on the support surface. Such projections serve laterally to locate vertically adjacent batteries and thus enhance the stability of a stack of such batteries.

It is preferred that the upstanding formations carry the battery terminals and that each upstanding formation is associated only with a single polarity event the electrical connection is preferably constituted by a substantially straight connector member extending between the two batteries and retained in electrical contact with the two said terminal surfaces. Alternatively or in addition, the two batteries may be so disposed that they afford respective and adjacent but inclined terminal surfaces, in which event the electrical connection is preferably constituted by a connector member extending between the two batteries and affording two inclined contact surfaces, each retained in electrical contact with a respective one of the two said terminal surfaces.

Figure 4:
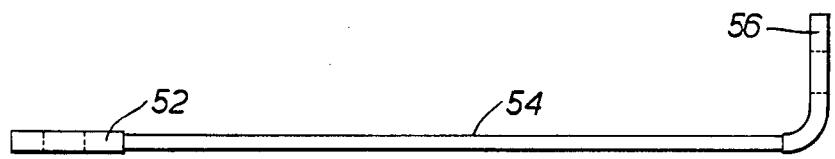
Figure 3:
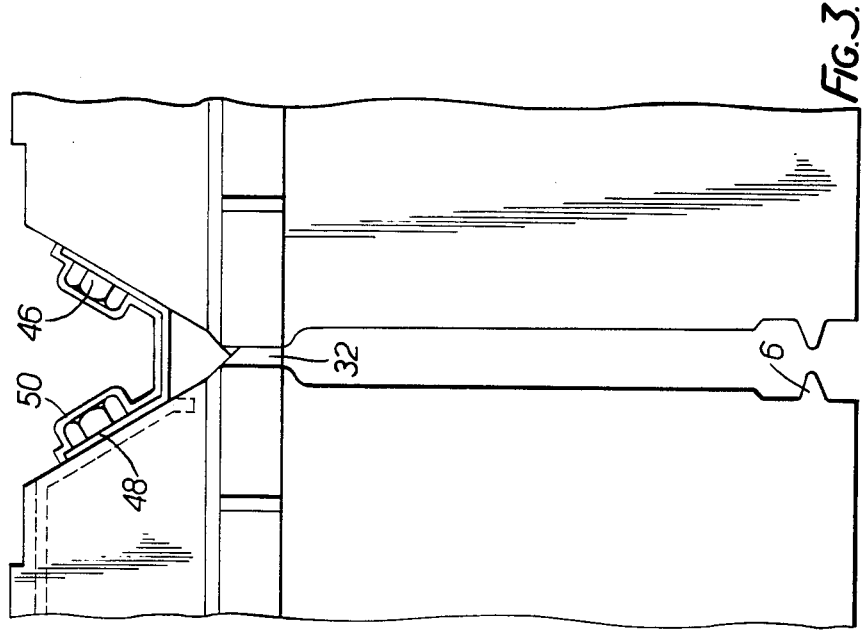
Figure 2:
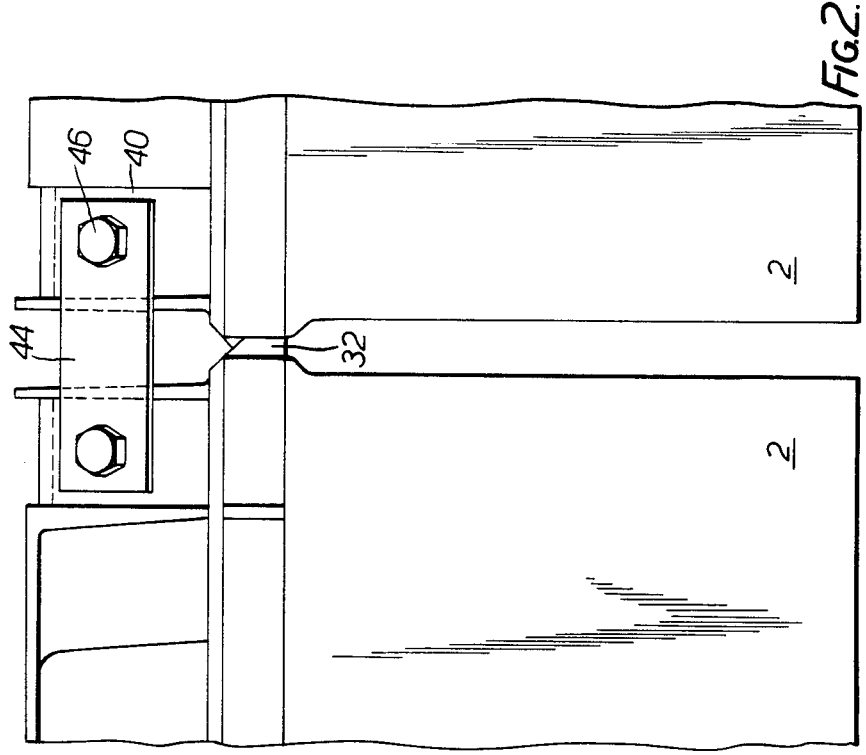

Further features and details of the present invention will be apparent from the following description of one specific embodiment which is given by way of example only with reference to the accompanying drawings, in which:

FIG. 1 is a perspective view of a 12 volt lead acid standby battery of recombination type; and FIGS. 2 and 3 are scrap side and end elevations respectively showing the two types of connector used to connect two batteries end to end and side by side; and FIG. 4 is an elevation of a connector used to connect two batteries situated one above the other.

Referring firstly to FIG. 1, the battery comprises a rectangular container 2 sealed by a lid 4. Towards the bottom of one or both pairs of opposed side walls of the container there are one or more so called hold-down ledges 6 by which the battery may be secured in position, if desired. The construction and function of such ledges is well known and forms no part of the present invention.

The electrical and electrochemical elements within the container also form no part of the present invention and are not shown but, briefly, the six cells are separated from one another by intercell partitions integral with the container and contain plates of alternating polarity separated by separators of microfine glass fibre material and substantially no free unabsorbed electrolyte. Adjacent cells are interconnected in any conventional manner by intercell connectors and the two end cells are connected to a respective terminal pillar which is connected to a terminal insert 8 (seen in FIG. 1) which is moulded into the battery lid and affords a threaded hole.

The lid 4 is a generally rectangular section integral moulding of polypropylene or the like and affords a substantially planar horizontal surface 10 and a depending skirt 12 which is connected, e.g. by hot plate welding to the container 2. Extending across substantially the full length of each of the two shorter sides of the lid is an upstanding formation 14 defined by a vertical web 16 adjacent the respective side of the lid and a further such web 18 extending parallel thereto. The bottom of the space defined between the webs 16 and 18 is closed by a web 20 which includes a central horizontal portion in which a respective terminal insert 8 is situated. The central horizontal portion terminates slightly short of the tops of the webs 16 and 18 and the web 20 has a step at each end defining a recess 22 at each end of the said space and terminating at each end in a ramp surface 24 extending downwardly and outwardly at 45°.

The ends of the webs 16 and 18 are inwardly inclined at between 30° and 70°, in this case at about 50° to the horizontal and the webs 18 are connected at their ends by webs 26 which constitute handles whose upper surface is substantially coplanar with that of the webs 16 and 18. The inner edge of each handle web 26 is integral with a vertical reinforcing web 28 which is also integral with the surface 10. Each web 28 is formed with a central cut-away portion 30. By virtue of the fact that the two handle webs 26 are spaced apart and are set back from the vertical side edges of the container, air can circulate freely under the handle web 26, through the cut-away portions 30 and over the planar surface 10 thereby maintaining the battery cool when it is passing a substantial current. The upper surface of the lid is provided with a downwardly and outwardly inclined elongate ramp surface 31 beneath each handle webs 26 which additionally promotes the inflow of convection currents of cooling air over and around the surface of the lid.

Each of the four sides of the depending skirt 12 is provided with two spaced spacing projections 32 to ensure that when two or more batteries are placed side by side they are spaced apart by at least about 5 mm to permit air to circulate freely about them. Each of the outer webs 16 is provided with a short central upstanding portion 34 arranged to fit into a hole or behind a peripheral rib (not shown) on the base of an identical battery stacked on it so as to locate the two batteries relative to one another.

An inverted U shaped terminal strap 36 of copper or the like rests on the horizontal portion of each web 20 with its upper surface slightly recessed below the tops of the webs 16 and 18 and is secured in position by a respective countersunk screw 37 which passes through a hole 38 in the strap and is received in the threaded hole in the insert 8. The two limbs 40 of the straps 36 extend downwardly and outwardly at a similar angle to the ends of the webs 16 and 18 covering the recesses 22 and engaging the associated ramped surfaces 24. The limbs 40 of the straps extend substantially parallel to the side edges of the webs 16 and 18 and constitute conductive planar terminal surfaces and are provided with a threaded hole 42 adapted to receive a bolt or the like which will extend into the associated recess 22 and electrically connect the battery to a trailing connector or a further battery. The free ends of the terminal straps extend vertically and are received in respective slots 25 adjacent the ramp surfaces 24 and thus protect the terminal straps against deformation.

The two terminal straps constitute large and exposed conductive areas and it will be appreciated that it would be easy inadvertently to short the battery. For this reason the battery is provided when sold with two terminal covers (not shown) of plastics material whose shape corresponds to that of the terminal straps and provided with integral hinges at positions corresponding to those at which the limbs 40 of the straps are connected to the horizontal cross-piece. The terminal covers may be secured in position by projections on them which are a push fit into the threaded holes 42 or further holes provided for this purpose.

The provision of an inclined conductive terminal surface of each polarity adjacent each of two opposed sides of the battery permits a large number of such batteries to be easily and rapidly connected together in series or parallel with considerable flexibility as regards the configuration of the batteries. FIG. 2 shows how two batteries may be connected end to end with two terminal surfaces of adjacent batteries lying in a common plane. A conductive connector bar or strip 44 is connected to the two terminal surfaces by means of bolts 46 which pass through holes in the connector bar and are received in the threaded holes 42. The connector bar bridges the gap between the two batteries and lies flat against the two terminal surfaces and is urged into reliable electrical contact therewith by the bolts 46.

FIG. 3 is a similar view showing how two batteries may be connected side by side by means of a conductive connector strip 48 bent to flat-bottomed V shape. As in FIG. 2, the connector strip is placed into contact with the terminal surfaces and there retained in position by bolts 46. The connector strip of FIG. 3 may be protected, if desired, by a similarly shaped plastics cover strip 50 moulded to shape or formed with appropriately positioned integral hinges and which are provided with recesses whose shape corresponds to that of the heads of the bolts and which are a push fit over the bolts. The connector strip of FIG. 2 may be similarly protected by means of a flat cover strip.

The flat upper surface afforded by the handle webs of the lid and the side webs 16 and 18 also permit batteries to be stacked vertically. Such batteries may be electrically connected by a connector of the type illustrated in FIG. 4. This comprises a flat conductive contact member or tag 52 electrically connected by means of a flexible connection 54, which may be sheathed in insulating material, to a cranked or right angled conductive contact member 56. Each contact member has a hole formed in it by which it may be retained in electrical contact with a respective terminal surface of a battery by means of a terminal bolt. In use, the cranked contact member 56 is connected to a terminal surface of a battery whilst the flat contact member 52 is connected to a terminal surface of a further battery resting on it. It will be appreciated that the angling of the contact member 56 directs the flexible connection 54 generally in the direction of the terminal surface of the uppermost battery and thus results in a reduction in the distance by which the flexible connection projects from the side surfaces of the two batteries. It will be appreciated that the provision of flat terminal surfaces affording a threaded hole permits each terminal surface to be readily connected to three or even more adjacent batteries using a single terminal bolt.

The stackability of the battery coupled with the provision of an inclined terminal surface of each polarity adjacent two opposed sides of the lid permits a large stack of such batteries to be formed and readily connected together in any desired electrical configuration for standby purposes. The construction and disposition of the handles together with the provision of the spacing projections ensures that air may readily circulate through the stack to cool it.

The batteries are readily located in their desired relative horizontal positions prior to connecting them by virtue of the fact that the spacing projections 32 on one of each pair of opposed sides of the lid are horizontally offset inwards with respect to the corresponding projections on the opposite side of the lid by a distance substantially equal to the horizontal thickness of the spacing projections. Thus when the two batteries are placed end to end or side by side the outer surfaces of a pair of projections on one battery contact the inner surfaces of the corresponding pair of projections on the other battery.

Obviously, numerous modifications and variations of the present invention are possible in the light of the above teachings. It is therefore to be understood that within the scope of the appended claim, the invention may be practiced otherwise than as specifically described herein.

What is claimed as new and desired to be secured by letters patent of the United States is:

1. An electric storage battery comprising a substantially rectangular container having at least two opposed vertical side surfaces, a lid sealing said container, the lid having two opposed side edges, two spaced upstanding formations extending adjacent the respective opposed side edges of said lid and support means extending between said two upstanding formations, said support means affording a substantially flat upper surface which is vertically spaced from the remainder of said lid and adpated to support a further such battery, said support means having two outer edges, said outer edges being spaced inwardly from said two opposed side surfaces of said container when viewed in plan.

2. A battery as claimed in claim 1 wherein said support means constitutes a handle means by which said battery may be lifted.

3. A battery as claimed in claim 2 wherein said handle means comprises two spaced elongate handle webs.

4. A battery as claimed in claim 1 wherein said lid affords a substantially flat surface extending between said upstanding formations and spaced below said upper surface of said support means.

5. A battery as claimed in claim 4 wherein the inner edge of each said handle web is connected to said substantially flat surface by a respective vertical reinforcing web, each said reinforcing web having an aperture to permit the circulation of air.

6. A battery as claimed in claim 1 wherein the surface of said lid is inclined downwardly and outwardly along the two opposed side edges which extend perpendicular to those edges adjacent which the upstanding formations are situated.

7. A battery as claimed in claim 1 wherein each said upstanding formation has two ends which are inclined downwardly and outwardly at an actue angle to the horizontal.

8. A battery as claimed in claim 1 wherein said lid has four side surfaces each of which carries two or more horizontally spaced spacing projections which extend beyond the associated side surface of the container when viewed in plan.

9. A battery as claimed in claim 8 wherein the spacing projections on each side surface of said lid are horizontally offset with respect to those on the opposite side surface of said lid, whereby when two such batteries are placed side by side the spacing projections on said two batteries serve to locate them in their desired relative horizontal positions.

10. A battery as claimed in claim 1 wherein the upper surface of said upstanding formations is substantially coplanar with said upper surface of said support means.

11. A battery as claimed in claim 1 wherein each said upstanding formation includes a projection which extends above said upper surface of said support means and which is adapted to co-operate with the base of a further such battery supported on said upper surface of said support means, thereby relatively locating the two said batteries.

12. A battery as claimed in claim 1 wherein said upstanding formations each carry a battery terminal of a single polarity.

13. A battery as claimed in claim 12 wherein said upstanding formations each comprise two vertical spaced webs defining between them a space accommodating a respective battery terminal.

14. A battery as claimed in claim 12 wherein each said battery terminal includes a flat terminal surface inclined at an acute angle to the horizontal.

15. A battery as claimed in claim 14 wherein each said battery terminal is constituted by a terminal strap comprising a substantially horizontal portion extending over said lid, said terminal strap having two ends connected to each of which is an inclined terminal surface, whereby there is a terminal surface of each polarity on each of two opposed sides of said lid.

* * * * *